(No Model.)
A. S. SIMPSON.
PUMP FOR PNEUMATIC TIRES.
No. 594,292. Patented Nov. 23, 1897.
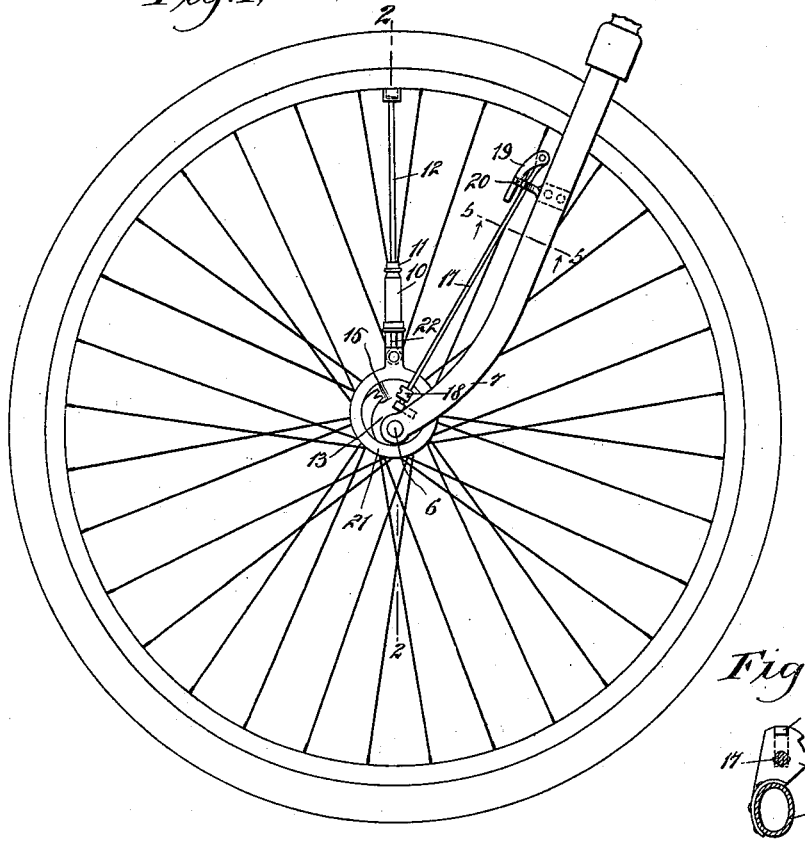

UNITED STATES PATENT OFFICE.

ALLANSON S. SIMPSON, OF FOLSOM, TERRITORY OF NEW MEXICO.

PUMP FOR PNEUMATIC TIRES.

SPECIFICATION forming part of Letters Patent No. 594,292, dated November 23, 1897.

Application filed June 3, 1897. Serial No. 639,265. (No model.)

*To all whom it may concern:*

Be it known that I, ALLANSON S. SIMPSON, of Folsom, in the county of Union and Territory of New Mexico, have invented a new and Improved Pump for Pneumatic Tires, of which the following is a full, clear, and exact description.

This invention is a pump for the pneumatic tires of bicycle and other vehicle wheels, the pump being operated by the movement of the wheel and being provided with means by which to throw it in and out of gear at the will of the person riding the vehicle.

This specification is the disclosure of one form of my invention, while the claims define the actual scope of the conception.

Reference is to be had to the accompanying drawings, forming a part of this specification, in which similar characters of reference indicate corresponding parts in all the figures.

Figure 1 is a side elevation of a bicycle-wheel equipped with my invention. Fig. 2 is a sectional view on the line 2 2, Fig. 1. Fig. 3 is a detail section taken through the eccentric which I employ. Fig. 4 is a face view of the eccentric, and Fig. 5 is a detail section looking upward from the line 5 5 of Fig. 1.

The invention is illustrated as applied to the front wheel of a safety-bicycle. The axle 6 of the wheel is held in the fork 7 of the frame, and the hub 8 turns loosely on the axle. A plate 9 is made fast to the hub 8 of the wheel and runs radially therefrom. A cylinder 10 is fixed to the plate 9 and is braced against spokes of the wheel by means of a wire lashing 11. A tube 12 leads from the cylinder 10 to the tire of the wheel, whereby to inflate the same.

An eccentric 13 is loose on the axle 6 and arranged alongside the wheel. The eccentric 13 has in its outer face an inclined way 14, at one end of which a lug 15 is formed, such lug having two recesses 16. Rocking in bearings carried by one arm of the fork 7 is a shaft 17, the lower end of which is provided with a fixed two-fingered dog 18. The shaft 17 may be rocked to engage and disengage said dog 18 with and from the lug 15. When the dog 18 is engaged with the lug 15, the eccentric 13 is fixed to the fork 7. When the parts 18 and 15 are disengaged, the eccentric turns idly around with the wheel. The upper end of the shaft 17 has a pivoted operating-arm 19 coacting with a ratchet-plate 20, fixed to one arm of the fork 7, the arm 19 by its operation with the ratchet-plate 20 serving to hold the shaft 17 in either of its two positions. An eccentric-strap 21 is mounted with antifriction-balls on the periphery of the eccentric 13. A piston-rod 22 is attached to the strap 21 and works through the inner head of the cylinder 10, the outer end of the rod 22 carrying a piston 23, which coacts with the cylinder.

If the dog 18 and the lug 15 are disengaged, the wheel in turning around the axle 6 carries the cylinder 10 with it, and the eccentric 13 and strap 21 will play idly around the axle 6, in which condition the piston 23 is not operated and the device is inactive. Should it be desired to supply air to the tire, the shaft 17 is rocked to engage the dog 18 with the lug 15, whereupon the eccentric 13 is made fast with the fork 7. When the wheel turns under these conditions, the eccentric-strap 21 moves around the eccentric, which imparts a reciprocal movement to the rod 22, and air is compressed within the cylinder 10 and forced through the tube 12 to the tire. The inclined way 14 on the eccentric guides the dog 18 up to engagement with the lug 15. The dog 18 is thrown against the eccentric by the action of the shaft 17, and as the eccentric revolves the dog is moved gradually up along the way 14 to engagement with the lug 15.

Various changes in the form, proportion, and minor details of my invention may be resorted to without departing from the spirit and scope thereof. Hence I do not consider myself limited to the precise construction herein shown, but believe that I am entitled to all such variations as come within the terms of my claims.

Having thus described my invention, I claim as new and desire to secure by Letters Patent—

1. The combination of a frame, an axle held thereby, a wheel turning loose on the axle, a cylinder carried by the wheel, a piston working in the cylinder, a rod attached to the piston, an eccentric loose on the axle and having a lug, a strap embracing the eccentric and connected with the rod of the piston, a shaft rocking in the frame, and a dog carried by the shaft and capable of engaging the lug whereby to stop the revolution of the eccentric.

2. The combination of a shaft, an eccentric loose thereon, the eccentric having a lug provided with two recesses and the face of the eccentric having an inclined way running up to the lug, a shaft rockably held by the frame, and a dog carried by the shaft and having two fingers capable of respectively engaging in the recesses of the lug.

3. The combination of a shaft, an eccentric loose on said shaft, a strap turning around the shaft and coacting with the eccentric, a rock-shaft mounted adjacent to the eccentric, and a dog carried on the rock-shaft and movable to engage and disengage the eccentric whereby to hold the same fixed with reference to the shaft.

ALLANSON S. SIMPSON.

Witnesses:
H. J. COLLINS,
T. B. MARSKE.